United States Patent [19]

Misaras et al.

[11] Patent Number: 5,284,314

[45] Date of Patent: Feb. 8, 1994

[54] MODULAR DUAL MUG AND CUP HOLDER

[75] Inventors: David M. Misaras, Pontiac; Dennis W. Poosch, Utica, both of Mich.

[73] Assignee: Davidson Textron Inc., Dover, N.H.

[21] Appl. No.: 959,763

[22] Filed: Oct. 13, 1992

[51] Int. Cl.$^5$ ............................................... A47K 1/00
[52] U.S. Cl. .................................. 248/311.2; 297/194; 224/42.44
[58] Field of Search ................. 248/311.2, 316.5, 912; 297/194, 191, 188; 224/281, 42.44, 42.43, 42.45 R; 220/703

[56] References Cited

U.S. PATENT DOCUMENTS

| | | | |
|---|---|---|---|
| 2,963,256 | 12/1960 | Borah | 248/314 |
| 4,040,659 | 8/1977 | Arnold | 297/194 |
| 4,783,037 | 11/1988 | Flowerday | 248/311.2 |
| 4,953,771 | 9/1990 | Fischer et al. | 224/881 X |
| 4,981,277 | 1/1991 | Elwell | 224/281 X |
| 5,024,411 | 6/1991 | Elwell | 248/311.2 |
| 5,052,728 | 10/1991 | Fukumoto | 224/41.45 R X |
| 5,060,899 | 10/1991 | Lorence et al. | 248/311.2 |
| 5,072,989 | 12/1991 | Spykerman et al. | 297/194 |
| 5,171,061 | 12/1992 | Marcusen | 248/311.2 X |

FOREIGN PATENT DOCUMENTS 2-109754  4/1990  Japan .................................. 224/281

Primary Examiner—Karen J. Chotkowski
Attorney, Agent, or Firm—Reising, Ethington, Barnard, Perry & Milton

[57] ABSTRACT

The modular dual mug and cup holder is allowed access upon sliding opening movement of the holder out of a housing, such as an armrest, into an open position. In a closed position, the holder slides into the housing disallowing access thereto. The holder includes a sliding member having a center planar divider with arcuate cutouts therein, and a pair of arcuate cup members producing generally circular cavities with the center support for holding containers or cups. In the closed position, the arcuate cup members are pivoted in overlapping orientation with one another and with the center planar divider for compact insertion within the housing. The holders slide outwardly automatically upon release of a push-push latch and a biasing spring.

19 Claims, 2 Drawing Sheets

MODULAR DUAL MUG AND CUP HOLDER

TECHNICAL FIELD

The invention relates to container or cupholder assemblies utilized in vehicles, and more particularly to container holders supported by and within an armrest or console of a vehicle.

BACKGROUND OF THE INVENTION

There are a variety of cupholders or container holders utilized for supporting cups, cans or other beverage containers in vehicles which are selectively accessible to the vehicle passengers or occupants. Many of these container holders have been stored in armrest assemblies in the vehicles.

U.S. Pat. No. 4,040,659, issued Aug. 9, 1977 in the name of Arnold discloses a food tray and a cupholder combination for automobiles which slides out from within the armrest and from the front face thereof. The trays pivot outwardly during opening of the combination. The problem with the holder is that it requires substantial lateral space in front of the armrest for extension and full deployment of a pair of cupholders and trays.

U.S. Pat. No. 5,060,899, issued Oct. 29, 1991 in the name of Lorence et al. discloses a nested container holder assembly. The assembly includes a housing supporting the nested container holder therein. A sliding member includes a cavity therein providing a first container holder which is exposed in the open position. In the open position, a second container holder pivots outwardly from within the first container holder and includes a cup shaped member for holding a second container.

SUMMARY OF THE INVENTION

The invention is a container holder assembly adapted to be utilized in a vehicle for supporting containers. The assembly comprises housing means having a cavity therein and an open end providing access to the cavity. Holder means is slideably connected with the housing means and has a closed position contained within the cavity and an open position extending outwardly from the cavity through the open end. The holder means includes a center divider member and a pair of arcuate cup members for pivoting in overlapping relation with the center divider member to slide within the housing means in the closed position and for pivoting outwardly from the center divider member forming a pair of container holders with the center container support in the open position.

BRIEF DESCRIPTION OF THE DRAWINGS

The advantages of the invention will become more readily apparent when taken in conjunction with the accompanying drawings wherein.

DESCRIPTION OF THE PREFERRED EMBODIMENT

Figure 1:
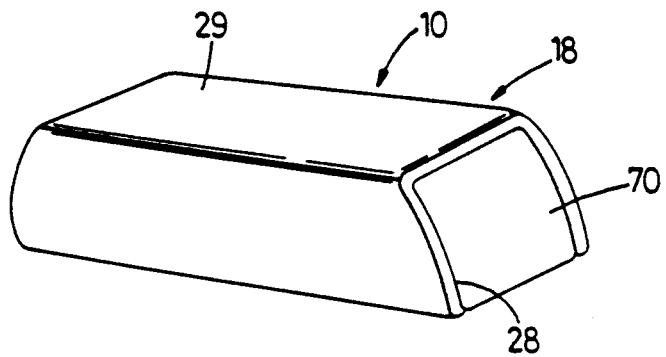
FIG. 1 is a perspective view of the assembly in the closed position.
Figure 2:
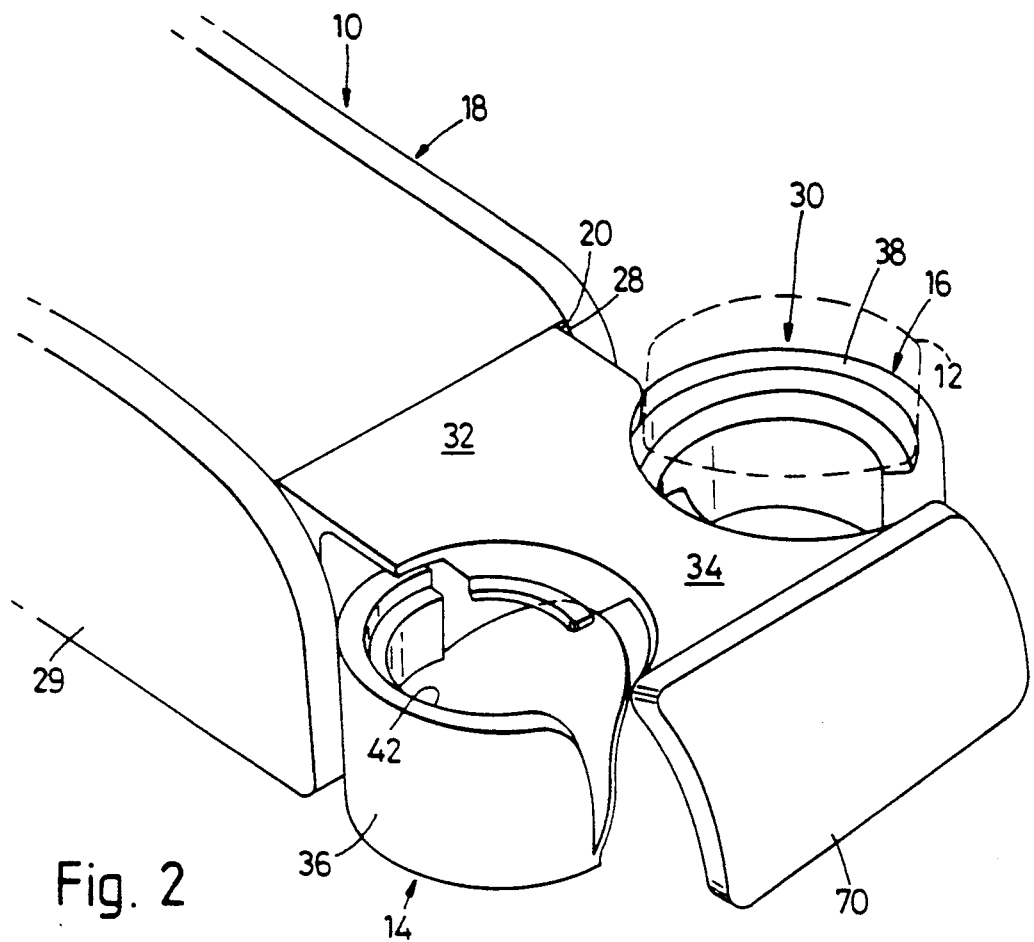
FIG. 2 is a perspective view of the assembly in the open position.
Figure 3:
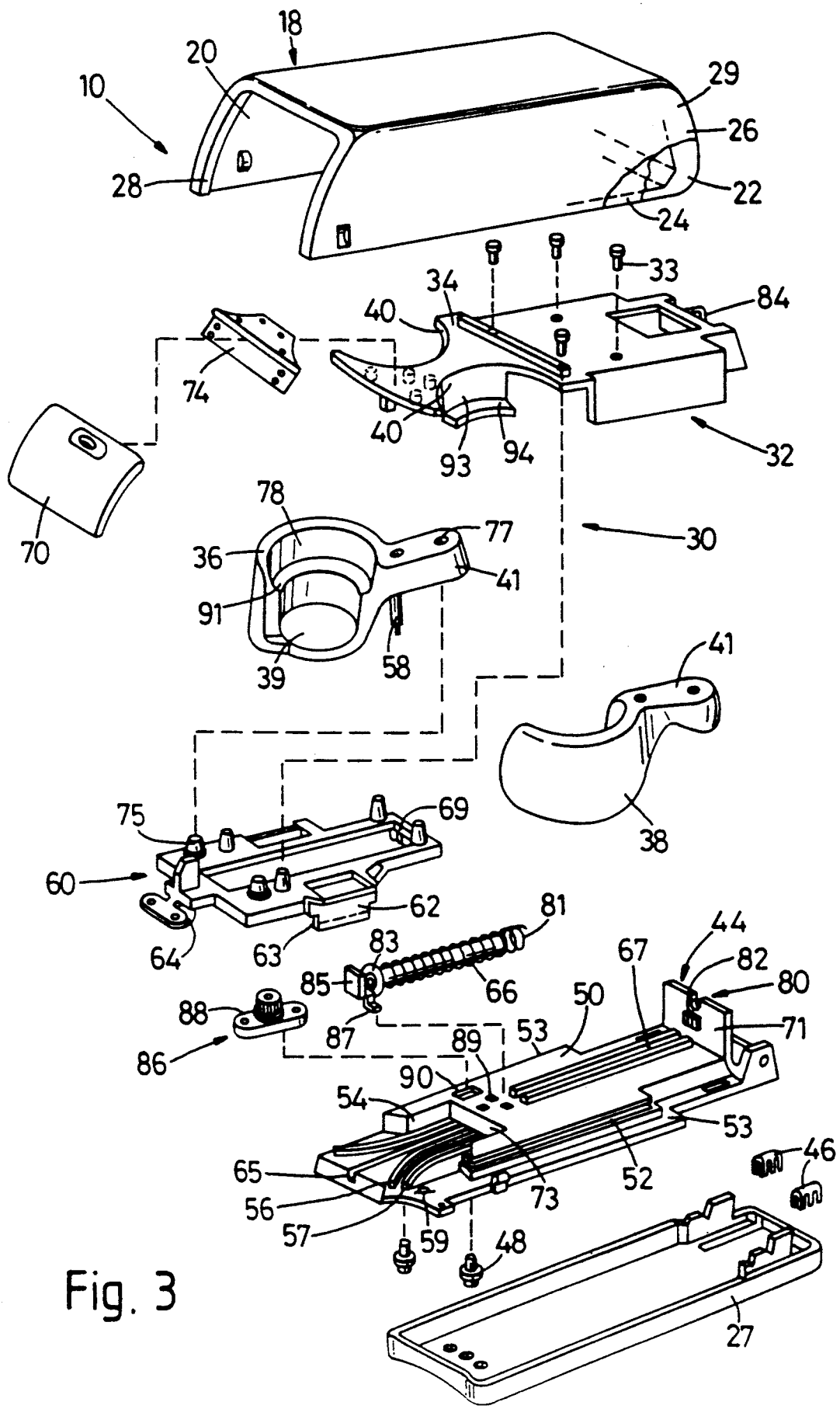
FIG. 3 is an exploded view of the assembly.

A container holder assembly adapted to be utilized in a vehicle for supporting containers 12 is generally illustrated at 10 in FIGS. 1-3. The assembly 10 includes a pair of container holders 14, 16 each for supporting a container 12. The assembly 10 has a closed position (FIG. 1) preventing access to the container holders 14, 16, and an open position (FIG. 2) allowing access to the container holders 14, 16. The assembly 10 may be implemented as an armrest assembly, a console, or the like. The preferred embodiment is illustrated as part of an armrest, however, it is to be understood that the features may be utilized in other types of assemblies, i.e., console, dash board, seat, etc.

The assembly 10 includes housing means 18 forming the armrest, as commonly known in the art. The housing means 18 is formed by a base plate 27 and a hollowed armrest bun or enclosure 29 secured to the base plate 27. The housing means 18 includes a cavity 20 formed therein between the base plate 27 and the bun 29. The bun 29 comprises a rigid plastic interior retainer 22 of a high strength plastic, such as ABS. The retainer 22 has a foam-in-place covering layer 24 molded thereto. A suitable material for the covering layer 24 is a polyurethane foam composition though other foam materials or soft padding are equally suitable for use with the present invention. A cover material 26 covers the foam 24 for aesthetics and wear properties. The bun 29 may be formed by commonly known molding principles and while it is shown as a composite plastic construction other housing means, including injection molded thermoplastic materials or metal fabricated housing can be used. The plastic retainer 24 is configured in a generally rectangular form having the hollow cavity 20 therein formed with the base plate 27 as a side of the rectangular form. The bun 29 is attached to the base plate 27 and has an open end 28 providing access to the cavity 20.

The assembly 10 also includes holder means 30 slideably retained within the housing means 18 having a closed position contained within the cavity 20 of the housing means 18 and an open position extending outwardly from the housing means 18 through the open end 28. The holder means 30 forms and provides the pair of container holders 14, 16.

The holder means 30 includes a top plate 32 slideably connected within the housing means 18 having a center divider member 34. A pair of arcuate cup members 36, 38 are pivotally connected with the top plate 32 for pivoting within and in overlapping relation with the center divider member 34 in the closed position and for pivoting outwardly and laterally from the center divider member 34 of the top plate 32 forming the pair of container holders 14,16 with the center divider member 34 in the open position. In other words, when the holder means 30 is in the closed position, the arcuate cup members 36, 38 are pivoted to a position under and vertically aligned with the center divider member 34. This allows the holder means 30 to slide and fit within the housing means 18 extending within the width of the cavity 20. In the open position, the arcuate cup members 36, 38 are pivoted outwardly from alignment with the center divider member 34 to a width greater than the width of the cavity 20.

Each arcuate cup member 36, 38 provides a partial cup shaped holder with a base 39. The center divider member 34 includes arcuate cutouts 40 formed therein opposing one another such that circular or cylindrical cavities 42 are provided for the two container holders 14, 16 between and formed by the center divider member 34 and arcuate cup members 36, 38.

The housing means 18 includes a support plate 44 fixedly secured to the base plate 27 by clips 46 and screws 48. The support plate 44 includes an upper surface 50 having side slide tracks 52 on each longitudinal side 53 thereof. The support plate 44 also includes a frontal recessed portion 54 in the upper surface 50 thereof to allow clearance for the arcuate cup members 36, 38 when in the closed position for storage in the cavity 20. Center tracks 65, 67 are provided along the longitudinal center of the support plate 44 on the surface 50 and within the recessed portion 54. The recess 54 includes cup guide tracks 56 therein for guiding linear sliding and arcuate pivotal movement of the cup members 36, 38 into and out of the cavity 20. Therefore, the cup guide tracks 56 include a linear portion extending outwardly to a curved or arcuate portion.

At the end of the cup guide tracks 56 are external molded-in spring fingers 57 which form the outer rail of the track 56 in the curved portion and which bias the arcuate cup members 36, 38 to a first smaller cup holder size. The finger 57 are not connected to the support plate 44 directly, but extend from the remainder of the stack 56 which is molded as part of the support plate 44. The fingers 57 may be pivoted outwardly upon an outward force on the member 36, 38 to provide a larger sized holder. Stops 59 spaced from the fingers 57 limit the pivotal movement of the fingers 57 to prevent permanent damage or breakage thereto. The arm 41 of the cup members 36, 38 includes a pin 58 extending downwardly therefrom for engagement within the track 56 to slide therein and guide the cup members 36, 38 linearly out of the cavity 20 and thereafter pivoting same outwardly.

The holder means 30 includes a slide plate 60 slideably connected on the support plate 44 and fixedly secured to the top plate 32 for sliding therewith. Screws 33 secure the plates 32, 60 to one another. The slide plate 60 includes track arms 62 extending perpendicular and downwardly therefrom for engagement and longitudinal linear guidance within the side slide track 52 of the support plate 44. Ribs 63 on the interior surface of the arms 62 engage with notches forming the track 52. The slide plate 60 also includes a center blade 64 engaging the center recessed guide track 65, and a rear pin 69 engaging the track 67. The slide tracks 52, 65, 67 control the sliding movement of the slide plate 60 and therefore top plate 32 longitudinally into and out of the housing means 32 between the closed and open positions.

The support plate 44 includes a rear stop wall 71 and a cup stop wall 73 for limiting insertion of the holder means 30 into the cavity 20.

The slide plate 60 includes pins 75 extending upwardly therefrom for receiving an aperture 77 of the arcuate cup members 36, 38 to support the pivotal members 36, 38 sandwiched between the slide plate 60 and top plate 32.

The holder means 30 includes latch means 80 for maintaining the holder means 30 in the closed position and for releasing same to allow the holder means 30 to move to the open position upon application of an external force. The latch means 80 includes a push-push type latch 82 secured to the rear stop wall 71 and which releases upon a first force or pushing action, and latches upon a second pushing force. The latch 82 may be of the type offered by South Co. Products. A hook 84 is provided on the end of the top plate 32 for engagement and disengagement within the latch 82.

The holder means 30 includes drive means 64 for initiating and producing the sliding movement of the slide plate 60 from the closed position to the open position. The drive means 64 includes a spring 81 positioned about a spring rod 66. The rod 66 is connected between the rear stop wall 71 of the support plate 44 and a front portion of the upper surface 50. A washer 83 is connected about the rod 66 between the spring 81 and stop end 85. The washer 83 abuts against the end of the top plate 32 to bias the top plate 32 toward the open position. The spring 81 biases the washer 83 and therefore top plate 32. The end 85 of the rod 66 is secured to the support plate 44 at by a snap flange 87 into recesses 89.

The holder means 30 includes dampener means 86 for controlling the automatic sliding movement of the slide plate 60. The dampener means 86 includes a dampener 88 having a gear with teeth thereon and fixedly connected to the support plate 44 at recess 90. The teeth interact with a gear track (not shown) on the lower side of the slide plate 60 to control slow movement thereof.

A door 70 closes the open end 28 when the holder means 30 is in the closed position. The door 70 is of the same construction as the bun 29, i.e., rigid retainer, foam, material. In this manner, the assembly 10 appears as a relatively uniform armrest in the closed position with the outer material matching and the door 70 closing the cavity 20. The door 70 is connected to the end 72 of the top plate 32 at the center divider member 34. The door 70 may be connected via a rigid bracket 74, or may be by a pivotal hinge to allow relief for the movement to activate the push-push latch 82.

The container holders 14, 16 are formed by the top plate 32 and arcuate cup members 36, 38. The base 39 of the arcuate cup 36, 38 is generally circular with vertical sides 78 extending perpendicular thereto. The sides 78 are formed partially around the circular base 39 thereby providing circular walls for supporting a container 12. The sides 78 are stepped to provide a narrowed base 39 with small radial dimension or diameter adjacent the base 39, and a step 91 to an enlarged diameter or radial dimension. The center divider member 34 includes a flange 93 extending perpendicular therefrom with a ledge 94 aligned with and to continue the step 91 about the circumference of the holders 14, 16. This stepped sides 91 and ledge 94 allow different diameter containers 12 to be inserted therein and securely maintained. For example, a large container will have its base rest on the step 91 and ledge 94. A small container will have it base rest on the base 39.

In operation, the assembly 10 is initially in the closed position (FIG. 1) with the bases 39 of the arcuate cup members 36, 38 in overlapping relation, the center divider 34 there above and overlapping the cup members 36, 38 such that the holder means 30 is enclosed within the cavity 20. The slide plate 60 and top plate 32 are slid against the rear stop 71 of the support plate 44 with the spring 81 compressed and slide plate 60 latched. Upon an inward force applied to the door 70, the latch 82 releases and the spring 81 biases the slide plate 60 outwardly with movement controlled by the dampener 88. The cup pins 58 slide in the track 56 pivoting the members 36, 38 outwardly when moved out of the cavity 20. When the holder means 30 is fully opened, the holders 14, 16 receive containers 12. If an enlarged container is utilized, the members 36, 38 may be forced outwardly a limited distance by the spring fingers 57 to receive a larger container 12. For closing, the door 70 is pushed and the members 36, 38 are pivoted into overlapping relation by guidance by the tracks 56 into the cavity 20. The latch 82 closes maintaining the holder means 30.

Any typical molding materials may be utilized to form the plates 32, 44, 60. In the preferred embodiment, the top plate 32 and arcuate members 36, 38 are made of ABS/polycarbonate blend, the slide plate is preferably made of ABS, and the support plate 44 is made of acetal.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A container holder assembly adapted to be utilized in a vehicle for supporting containers, said assembly comprising:
   housing means having a cavity therein and an open end providing an opening for access to the cavity;
   holder means slideably connected with said housing means having a closed position contained within said cavity of said housing means and an open position extending outwardly from said cavity of said housing means through the opening;
   said holder means including a center divider member and a pair of pivotal arcuate cup members for pivoting in overlapping relation with said center divider member to slide within said housing means in said closed position and for pivoting outwardly from said center divider member forming a pair of container holders therewith in said open position sliding out of said housing means;
   each of said arcuate cup members including a side wall for supporting a side of a container and a base fixedly connected to said side wall for supporting a bottom of the container so that said side wall and base pivot with one another in a common direction during movement between said open and closed positions.

2. A container holder assembly as set forth in claim 1 wherein said holder means includes a top plate for forming said center divider member.

3. A container holder assembly as set forth in claim 2 wherein said holder means includes a slide plate fixedly connected to said top plate for supporting said arcuate cup members in pivotal relation with said top plate.

4. A container holder assembly as set forth in claim 3 wherein said housing means includes a support plate for slideably supporting said slide plate within and extending from said cavity.

5. A container holder assembly as set forth in claim 4 wherein said support plate includes tracks thereon for linearly guiding said slide plate into and out of said cavity.

6. A container holder assembly as set forth in claim 5 wherein said support plate includes cup guide tracks for guiding said arcuate cup members linearly out of said cavity and for guiding said arcuate cup members in pivoting relation to said slide plate outwardly from overlapping relation and outwardly from said center divider member.

7. A container holder assembly as set forth in claim 6 wherein said housing means comprising an armrest.

8. A container holder assembly as set forth in claim 6 further including latch means connected between said slide plate and said support plate for alternately latching and releasing said holder means in response to a linear force on said slide plate.

9. A container holder assembly as set forth in claim 8 further including drive means for automatically moving said holder means from said closed position to said open position upon release of said latch means.

10. A container holder assembly as set forth in claim 9 further including dampening means operatively connected between said slide plate and said support plate for controlling speed of opening by said drive means.

11. A container holder assembly as set forth in claim 6 wherein said arcuate tracks include spring fingers at ends thereof for allowing expansion of said container holders upon application of a force thereto.

12. A container holder assembly as set forth in claim 1 wherein said arcuate cup members include stepped side walls providing a circular base with side walls of a first radial dimension extending to stepped walls of a second radial dimension greater than said first diameter.

13. A container holder assembly as set forth in claim 12 wherein said center divider member includes a stepped flange extending therefrom to provide the first and second radial dimensions with said arcuate cup members in the open position.

14. An assembly as set forth in claim 1 wherein said side wall and said base comprise integral member with the side wall connected substantially perpendicular to said base.

15. A container holder assembly adapted to be utilized in a vehicle for supporting containers, said assembly comprising:
   holder means for supporting at least two containers; and
   said holder means including a center divider member and a pair of pivotal arcuate cup members for pivoting outwardly with respect to said center divider member to form a pair of container holders between said center divider member and said arcuate cups,
   each of said arcuate cup members including a side wall for supporting a side of a container and a base fixedly connected to said side wall for supporting a bottom of the container so that said side wall and base pivot with one another in a common direction during movement between said open and closed positions.

16. An assembly as set forth in claim 15 wherein said side wall and said base comprise an integral member with the side wall connected substantially perpendicular to said base.

17. A container holder assembly adapted to be utilized in a vehicle for supporting containers, said assembly comprising:
   housing means having a cavity therein and an open end providing an opening for access to the cavity;
   holder means slideably connected with said housing means having a closed position contained within said cavity of said housing means and an open position extending outwardly from said cavity of said housing means through the opening;
   said holder means including a center divider member and a pair of pivotal arcuate cup members for pivoting with said center divider member to slide within said housing means in said closed position and for pivoting outwardly from said center divider member forming a pair of container holders therewith in said open position sliding out of said housing means;

said holder means including a top plate for forming said center divider member;

said holder means including a slide plate fixedly connected to said top plate for supporting said arcuate cup members in pivotal relation with said top plate; and said housing means including a support plate for slideably supporting said slide plate within and extending from said cavity.

18. A container holder assembly adapted to be utilized in a vehicle for supporting containers, said assembly comprising:

housing means having a cavity therein and an open end providing an opening for access to the cavity;

holder means slideably connected with said housing means having a closed position contained within said cavity of said housing means and an open position extending outwardly from said cavity of said housing means through the opening;

said holder means including a center divider member and a pair of pivotal arcuate cup members for pivoting with said center divider member to slide within said housing means in said closed position and for pivoting outwardly from said center divider member forming a pair of container holders therewith in said open position sliding out of said housing means;

said arcuate cup members including stepped side walls providing a circular base with said walls of a first radial dimension extending to stepped walls of a second radial dimension greater than said first diameter; and said center divider member including a stepped flange extending therefrom to provide the first and second radial dimensions with said arcuate cup members in the open position.

19. A container holder assembly adapted to be utilized in a vehicle for supporting containers, said assembly comprising:

housing means having a cavity therein and an open end providing an opening for access to the cavity;

holder means slideably connected with said housing means having a closed position contained within said cavity of said housing means and an open position extending outwardly from said cavity of said housing means through the opening;

said holder means including a center divider member and a pair of pivotal arcuate cup members for pivoting with respect to said center divider member to slide within said housing means in said closed position and for pivoting outwardly from said center divider member forming a pair of container holders therewith in said open position sliding out of said housing means;

each of said arcuate cup members including a side wall for supporting a side of a container and a base fixedly connected to said side wall for supporting a bottom of the container so that said side wall and base pivot with one another in a common direction during movement between said open and closed positions.

* * * * *